(12) United States Patent
Setterberg et al.

(10) Patent No.: US 9,971,925 B2
(45) Date of Patent: May 15, 2018

(54) METHOD AND FINGERPRINT SENSING SYSTEM FOR ACQUIRING A FINGERPRINT IMAGE

(71) Applicant: Fingerprint Cards AB, Göteborg (SE)

(72) Inventors: Eric Setterberg, Västra Frölunda (SE); Morten Rolle Hansen, Vanløse (DK); Bin Hu, Charlottenlund (DK); Michael Sass Hansen, Søborg (DK)

(73) Assignee: FINGERPRINT CARDS AB, Göteborg (SE)

( * ) Notice: Subject to any disclaimer, the term of this patent is extended or adjusted under 35 U.S.C. 154(b) by 20 days.

(21) Appl. No.: 15/366,366

(22) Filed: Dec. 1, 2016

(65) Prior Publication Data
US 2017/0169271 A1    Jun. 15, 2017

(51) Int. Cl.
*G06K 9/00* (2006.01)
*G06K 9/03* (2006.01)

(52) U.S. Cl.
CPC ........... *G06K 9/0002* (2013.01); *G06K 9/001* (2013.01); *G06K 9/036* (2013.01)

(58) Field of Classification Search
CPC ....... G06K 9/0002; G06K 9/086; G06K 9/001
See application file for complete search history.

(56) References Cited

U.S. PATENT DOCUMENTS

| | | | |
|---|---|---|---|
| 6,330,345 B1 | 12/2001 | Russo et al. | |
| 6,990,218 B2 * | 1/2006 | Wirtz | G06K 9/0002 283/68 |
| 8,320,663 B2 * | 11/2012 | Bodnar | G01J 3/02 382/162 |
| 8,797,167 B2 * | 8/2014 | Bangera | G06F 19/3456 340/309.16 |
| 2001/0031075 A1 * | 10/2001 | Fujii | G06K 9/00006 382/125 |
| 2002/0021827 A1 * | 2/2002 | Smith | G06K 9/00013 382/124 |
| 2003/0012451 A1 * | 1/2003 | Shigeta | H04N 5/365 382/274 |
| 2003/0068073 A1 | 4/2003 | Wirtz | |
| 2006/0045315 A1 * | 3/2006 | Saitoh | G06K 9/00026 382/115 |
| 2007/0003110 A1 | 1/2007 | Gutta et al. | |
| 2009/0196468 A1 * | 8/2009 | Chang | G06F 3/0488 382/124 |
| 2010/0245553 A1 * | 9/2010 | Schuler | G06K 9/00006 348/77 |
| 2012/0014570 A1 * | 1/2012 | Abe | G06K 9/00067 382/124 |
| 2012/0016798 A1 | 1/2012 | Carper | |
| 2014/0286545 A1 | 9/2014 | Yi et al. | |
| 2016/0078274 A1 * | 3/2016 | Tuneld | G06K 9/0002 382/124 |

FOREIGN PATENT DOCUMENTS

WO    9926187 A1    5/1999

* cited by examiner

Primary Examiner — Samir Ahmed
(74) Attorney, Agent, or Firm — RMCK Law Group PLC

(57) ABSTRACT

The present invention generally relates to a method for acquiring a fingerprint image using a fingerprint sensing system. Advantages with the invention include improved acquisition of fingerprint images of e.g. wet (sweaty) fingers. The invention also relates to a corresponding fingerprint sensing system and to a computer program product.

16 Claims, 3 Drawing Sheets

METHOD AND FINGERPRINT SENSING SYSTEM FOR ACQUIRING A FINGERPRINT IMAGE

TECHNICAL FIELD

The present invention generally relates to a method for acquiring a fingerprint image using a fingerprint sensing system, and specifically to fingerprint image acquisition of fingers having a somewhat increased humidity level (sweaty). The invention also relates to a corresponding fingerprint sensing system and to a computer program product.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One problem for capacitive fingerprint sensors is that the finger conductivity varies strongly with the humidity of the finger. For dry fingers, the result may be that the outer part of the skin (stratum corneum) has higher impedance (lower capacitance) than the sensor dielectric, so that the combined series capacitance is dominated by the finger impedance. This ridge may then seem more like a valley than like a ridge.

For wet fingers, where water or saline (sweat) fill the valleys, the problem is mainly that the saline is even more conductive than the stratum corneum. With the described capacitive measuring technique this gives a high signal for both valleys and ridges, so that it is difficult to separate the two. When converted to a digital image of the finger, the result may be a low-contrast "inverted" image where the well-conducting valley appears as "black" and the slightly less conductive ridges appear as "dark grey". Such an image does not easily lend itself to software algorithms aimed at fingerprint recognition.

An exemplary implementation for trying to overcome this problem is disclosed in U.S. Pat. No. 6,330,345. U.S. Pat. No. 6,330,345 discloses an image acquisition method according to which a plurality of images are captured using different settings (such as for dry, normal and sweaty fingers). The segments of the plurality of images are stitched for achieving a fingerprint image of the best possible quality. Even though U.S. Pat. No. 6,330,345 introduces an interesting approach to acquiring a fingerprint image, the additional steps of analyzing and stitching segments of the plurality of images will increase necessary image processing, thereby placing additional constrains of the electronic device including the fingerprint sensing system. Thus, there appears to be room for further improvement in regards to the acquisition of a fingerprint image in conditions when the finger is wet (sweaty), for example limiting any additional computational step when acquiring a high quality fingerprint image.

SUMMARY OF THE INVENTION

In view of above-mentioned and other drawbacks of the prior art, it is an object of the present invention to provide an improved method for acquiring a fingerprint image using a fingerprint authentication system. In particular, the present inventors have found that it may be desirable to take into account the behavior of a finger, in relation to being wet, and to make use of specific "sweaty finger" sensor setting in an initial phase of acquiring a fingerprint image.

According to an aspect of the present invention, it is therefore provided a method of acquiring a fingerprint image of a finger by means of a fingerprint sensing system comprising a fingerprint sensor and processing circuitry connected to the fingerprint sensor, wherein the method comprises the steps of receiving an indication of the finger contacting the fingerprint sensor, applying a first fingerprint image acquisition setting for the fingerprint sensor, the first fingerprint image acquisition setting including a first sensitivity level for the fingerprint sensor, acquiring, subsequent to receiving the indication of the finger contacting the fingerprint sensor, a first fingerprint image using the first fingerprint image acquisition setting, applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level, acquiring, subsequent to applying the second fingerprint image acquisition setting, a first fingerprint image using the second fingerprint image acquisition setting, evaluating the acquired fingerprint images based on a quality metric, and selecting at least one of the acquired fingerprint images satisfying the quality metric.

The present invention is based upon the assumption that some fingers, and under some conditions, may be somewhat more humid/sweaty than a "normal" finger or under a normal condition. To handle such a possible condition, the inventors have realized that is would be advantageous to acquire a fingerprint image "as soon as the finger is contacting the fingerprint sensor" (preferably directly subsequent of an indication of a finger contacting the fingerprint sensor) and apply a sensor setting that is tuned specifically for a finger being somewhat more humid as compared to a normal finger. Thereafter, the sensor setting is changed to handle a normal or "dry" finger using a more "normal" sensor setting. It has been identified that dry and "normal" fingers are less sensitive to the timing in that way so the delay caused by the acquisition of the first fingerprint image will not cause any image quality issues (i.e. for the second fingerprint image). In comparison, a wet (sweaty) finger will soon after contacting the fingerprint sensor be obscuring the fingerprint pattern (ridges and valleys) with sweat. Accordingly, an "early" acquisition of a fingerprint using the specifically adapted finger sensor setting may improve the possibility of acquiring a fingerprint image also in cases where the finger used is wet/sweaty, thus increasing user convenience. It should be understood that the order of applying the first sensor setting and receiving an indication of the finger contacting the fingerprint sensor is irrelevant.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "processing circuitry" should be understood to include any type of computing device, such as an ASIC, a microprocessor, etc. It should also be understood that the actual implementation of such a processing circuitry may be divided between a plurality of devices/circuits.

In a possible embodiment of the invention, the method further comprises acquiring, subsequent to acquiring the first fingerprint image using the first fingerprint image acquisition setting, a second fingerprint image using the first fingerprint image acquisition setting. That is, also a fingerprint image (i.e. the second fingerprint image acquired using the first fingerprint image acquisition setting) taken slightly later may be acquired, still using the "sweaty finger sensor settings" (i.e. the first fingerprint image acquisition setting). Thus, in case the sweaty finger sensor settings were set for a slightly sweatier finger (than what was the case when acquiring the first fingerprint image), a short duration between the acquisition of the first and the further fingerprint image may have been sufficient to allow for the second fingerprint image acquired using the first fingerprint image acquisition setting to have a sufficient quality. Possibly, the second fingerprint image acquired using the first fingerprint image acquisition setting may be acquired a predetermined time subsequent to acquiring the first fingerprint image acquired using the first fingerprint image acquisition setting, the predetermined time being between about 5-60 ms, preferably between 15-60 ms. Other predetermined time periods are also possible and may be dependent on the fingerprint sensor. This separation in time will, in case of a sweaty finger, allow at least some sweat spread in the valleys of the finger, thus more correctly matching the first fingerprint image acquisition setting.

In accordance to the invention, the selection of the at least one of the acquired fingerprint images is based on an evaluation of the acquired fingerprint images in relation to a quality metric. The "quality" as such may be determined by examining a spatial intensity variation in the fingerprint images, as will be further discussed below. Alternatively, or also, it may be possible to examining the saturation and/or histogram width of the acquired fingerprint image. Further quality metrics exists, including for example a measure for the "ease" of acquiring a feature template from the acquired fingerprint image.

As mentioned above, the sensor settings are typically applied for controlling the sensitivity of the sensor when acquiring the fingerprint images. In a possible implementation, a range for A/D conversion means used in acquiring the fingerprint image may also or alternatively controlled for adapting the sensitivity of the sensor.

In some embodiment of the invention it may be desirable to retrieve a signal indicative of an environmental condition that may affect a property of the finger, and control the fingerprint sensor additionally based on the environmental condition. As also mentioned above, the fingerprint sensor may in some instances behave in somewhat different ways dependent on ambient conditions. Such conditions may for example include temperature and/or humidity in the vicinity of the fingerprint sensor (e.g. acquired using one of a temperature sensor and a humidity sensor), and may in some instances have impact on how wet a finger may be once contacting the fingerprint sensor. In a possible embodiment, different sensor settings to be used as the first fingerprint image acquisition setting may be pre-stored for different ambient conditions and used dependent on such conditions. It may also be possible to adapt the sensor settings based on a known relation between a specific environmental condition and a likely sensor setting to be used for such a condition. As an example, it may be possible to correlate the ambient temperature with the setting used for the gain control of the fingerprint sensor. For example, a high ambient temperature may typically result in a lower gain level as compared with operation of the fingerprint sensor in a low temperature environment. In addition, the environmental condition may be related to a geographical location, e.g. based on information from a GPS sensor or similar. In addition, it may be possible to use information of a task currently performed by a user operating the fingerprint sensing system. For example, if there is an indication that the user is exercising, such information may be used as an indication of that the user/finger may be somewhat more humid as compared to a normal situation.

Possibly, the method further comprises applying, subsequent to acquiring the first fingerprint image using the second fingerprint image acquisition setting, a third fingerprint image acquisition setting for the fingerprint sensor, the third fingerprint image acquisition setting being based on the evaluation of the first fingerprint image acquired using the second fingerprint image acquisition setting, and acquiring a first fingerprint image using the third fingerprint image acquisition setting. Accordingly, in such an embodiment it may be possible to use the evaluation also for determining a sensor setting for further improving a subsequently acquired fingerprint image. This may be further iterated as to adjusting the sensor setting, i.e. also further/additional fingerprint images may be acquired using a previously determined quality of the previously acquired fingerprint images. It should be noted, in case the already acquired fingerprint images are determined to satisfy the quality metric, the acquisition of further/additional fingerprint images may not be necessary.

As understood from the above, it is desirable to select the "best" (or a plurality of fingerprint images satisfying the predetermined quality metric) to be used in further operation of the fingerprint sensing system. In a possible embodiment of the invention, the (at least one) selected fingerprint image is also arranged to undergo image post processing for further improving quality of the fingerprint image. Such post processing procedures as well known to the skilled person. It may also be possible, and within the scope of the invention, to combine a plurality of acquired fingerprint images.

According to another aspect of the present invention, there is provided a fingerprint sensing system, comprising a fingerprint sensor, a memory, and processing circuitry connected to the fingerprint sensor for receiving an indication of the finger contacting the fingerprint sensor, applying a first fingerprint image acquisition setting for the fingerprint sensor, the first fingerprint image acquisition setting including a first sensitivity level for the fingerprint sensor, acquiring, subsequent to receiving the indication of the finger contacting the fingerprint sensor, a first fingerprint image using the first fingerprint image acquisition setting, applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level, acquiring, subsequent to applying the second fingerprint image acquisition setting, a first fingerprint image using the second fingerprint image acquisition setting, evaluating the acquired fingerprint images based on a quality metric, and selecting at least one of the acquired fingerprint images satisfying the quality metric. This aspect of the invention provides similar advantages as discussed above in relation to the previous aspect of the invention.

The fingerprint sensor may, as indicated above, be implemented using any kind of currently or future fingerprint sensing principles, including for example capacitive, optical, or thermal sensing technology. However, at present capacitive sensing is most preferred. Both one and two-dimensional sensors are possible and within the scope of the invention.

The fingerprint sensing system preferably forms part of an electronic device further comprising a device controller for performing an authentication of the finger based on the at least one selected fingerprint image, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

According to a further aspect of the present invention, there is provided a computer program product comprising a computer readable medium having stored thereon computer program means for controlling a portable electronic device, the portable electronic device comprising a fingerprint sensing system including a fingerprint sensor and processing circuitry, the fingerprint sensing system adapted for acquiring a fingerprint image of a finger, wherein the computer program product comprises code for receiving an indication of the finger contacting the fingerprint sensor, code for applying a first fingerprint image acquisition setting for the fingerprint sensor, the first fingerprint image acquisition setting including a first sensitivity level for the fingerprint sensor, code for acquiring, subsequent to receiving the indication of the finger contacting the fingerprint sensor, a first fingerprint image using the first fingerprint image acquisition setting, code for applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level, code for acquiring, subsequent to applying the second fingerprint image acquisition setting, a first fingerprint image using the second fingerprint image acquisition setting, code for evaluating the acquired fingerprint images based on a quality metric, and code for selecting at least one of the acquired fingerprint images satisfying the quality metric. Also this aspect of the invention provides similar advantages as discussed above in relation to the previous aspects of the invention.

In summary, present invention generally relates to a method for acquiring a fingerprint image using a fingerprint sensing system. Advantages with the invention include improved acquisition of fingerprint images of wet (sweaty) fingers. The invention also relates to a corresponding electronic device and to a computer program product.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
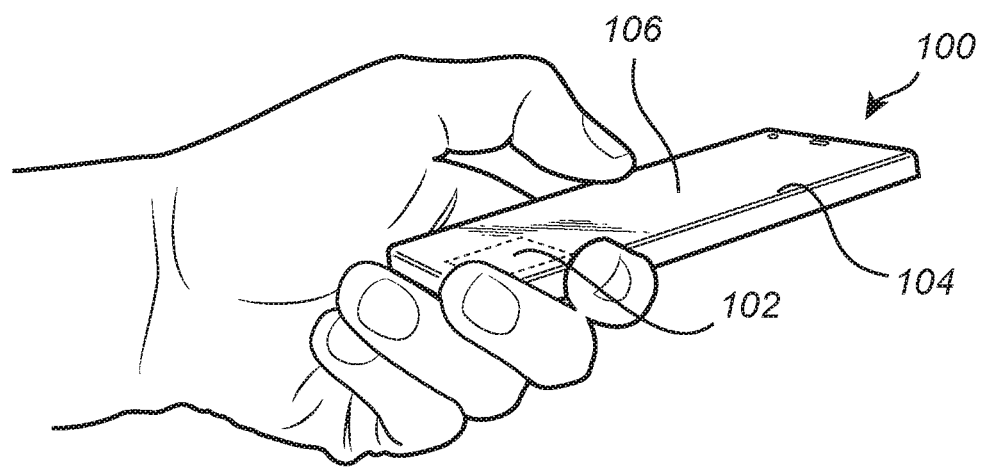
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
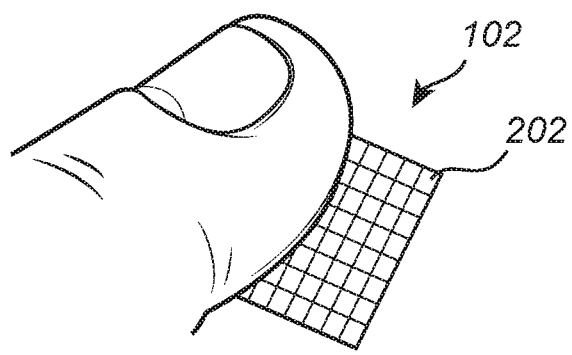
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figures 3A, 3B, 3C, 3D:
FIGS. 3a to 3d exemplify four images of a finger having a somewhat increased humidity level when contacting the fingerprint sensor.
Figures 6A, 6B, 6C, 6D:

FIGS. 3a-3d exemplify four images that have been sequentially acquired when a user places his finger in contact with a fingerprint sensor 102, in a case where the finger is somewhat more humid (sweaty) as compared to a normal finger. The images are taken roughly 10 ms apart from each other and generally illustrate how a sweaty finger will "behave" when contacting a fingerprint sensor. Looking at the first two images, FIGS. 3a and 3b, it may be observed that in early images it is a higher chance of getting a good image quality. As can be seen, the image quality will start low (FIG. 3a, the finger is just contacting the fingerprint sensor), increase and then fall again (FIG. 3d, sweat saturates the image). The rate is of course depending on the speed of approach of the finger when contacting the fingerprint sensor 102. The speed of approach of the finger is however typically not known beforehand.

As is illustrated from FIG. 3a to FIG. 3d, the humidity at the finger will over time gradually obscure the valleys between the friction ridges, typically by sweat being released from pores on the ridges themselves. Low levels of sweat are absorbed by the epidermis and make the skin more conductive.

In accordance to the invention, the above understanding is taken into account for optimizing the acquisition of a fingerprint image. Specifically and as has been elaborated the finger contacting the fingerprint sensor 102 is assumed to be somewhat more humid as compared to a normal finger when initially contacting the fingerprint sensor 102. Based on above discussion, it is desirable to acquire a fingerprint image as soon as possible from when the finger is making contact with the fingerprint sensor 102 (i.e. before image saturation). In addition, since the finger is assumed to be somewhat more humid as compared to a normal finger, a specific sensor setting is applied to the fingerprint sensor 102 that is targeting the assumed type of finger (i.e. a wet/sweaty/humid finger). Such a sensor setting is arranged to set a sensitivity level of the fingerprint sensor 102. As the finger as a consequence is assumed to have a higher conductivity as compares to a normal finger, the sensitivity for the fingerprint sensor 102 is, at least when acquiring the initial fingerprint image, set to a slightly lower level as compared to a typical approach where the sensitivity level for the fingerprint sensor 102 is set to a more normalized level.

Figure 4:
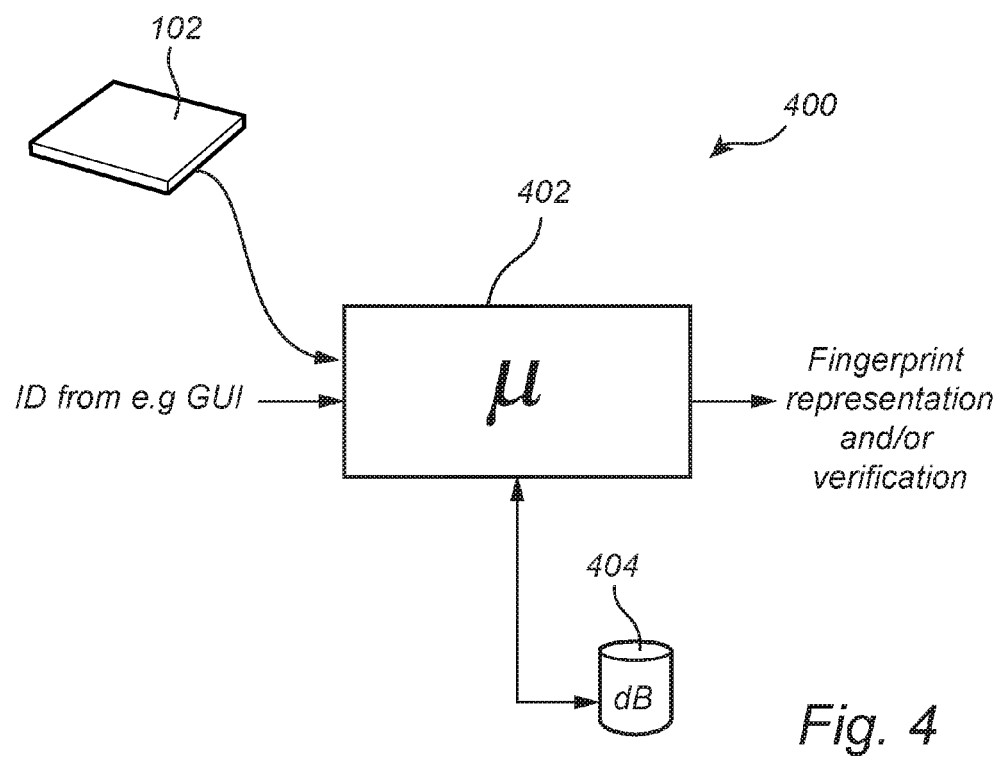
FIG. 4 conceptually illustrates a fingerprint sensing system according to a currently preferred embodiment of the invention.

In accordance with the invention, the fingerprint sensor 102 and the operation for acquiring a fingerprint image is achieved using a conceptualized fingerprint sensor system 400 as is illustrated in FIG. 4. The fingerprint sensor system 400 in turn, typically, forms part of the electronic device/mobile as is exemplified in FIG. 1.

The fingerprint sensor system 400 comprises the fingerprint sensor 102 and a processing circuitry, such as a control unit 402 for controlling the fingerprint sensor 102. The fingerprint sensor system 400 further comprises a memory, such as a database 404. The control unit 402 may each include a microprocessor, microcontroller, programmable digital signal processor or another programmable device. The control unit 402 may also, or instead, each include an application specific integrated circuit, a programmable gate array or programmable array logic, a programmable logic device, or a digital signal processor. Where the control unit 402 includes a programmable device such as the microprocessor, microcontroller or programmable digital signal processor mentioned above, the processor may further include computer executable code that controls operation of the programmable device. It should be understood that all or some parts of the functionality provided by means of the control unit 402 (or generally discussed as "processing circuitry") may be at least partly integrated with the fingerprint sensor 402.

Figure 5:
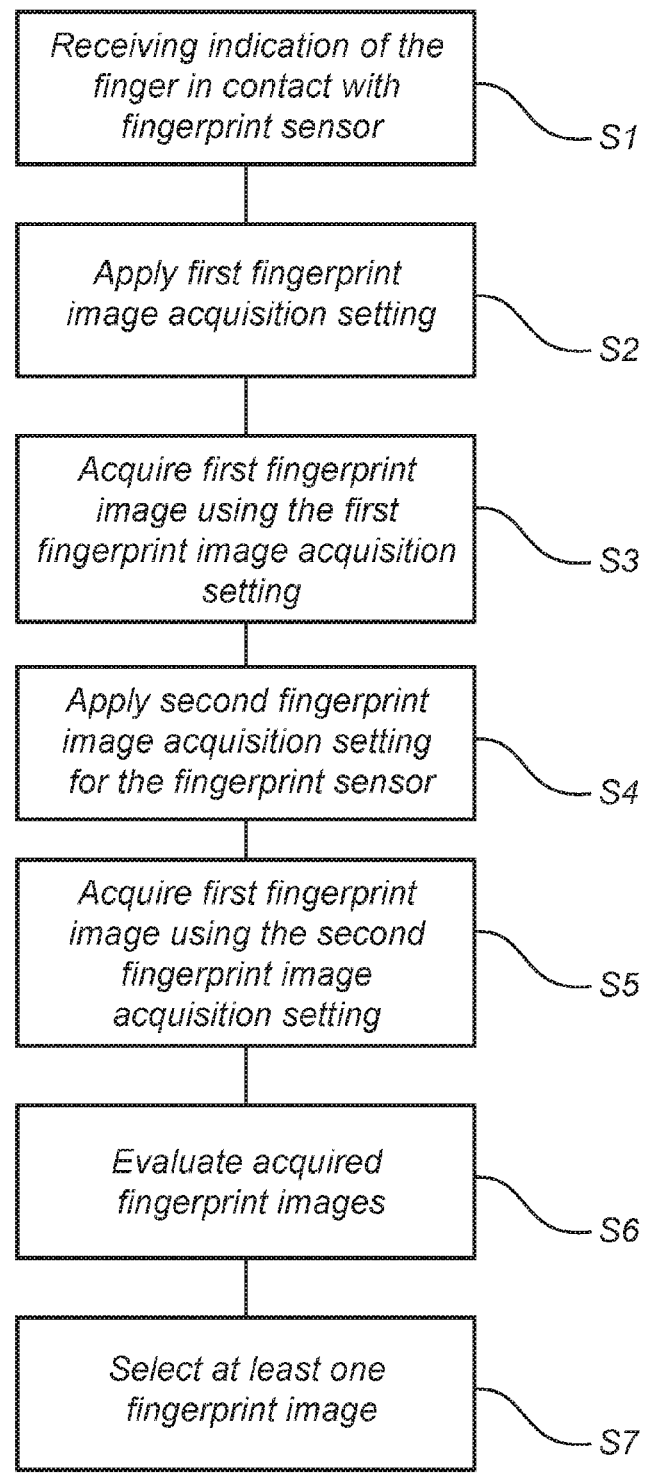
FIG. 5 is a flowchart disclosing the exemplary steps of the invention typically performed in conjunction with the fingerprint sensing system of FIG. 4, and FIGS. 6a to 6d exemplify four images of a finger having a normal humidity level when contacting the fingerprint sensor.

During operation of the fingerprint sensor system 400, with further reference to FIG. 5, the fingerprint sensor system 400 is arranged to receive, S1, an indication of the finger contacting the fingerprint sensor 102. The fingerprint sensor 102 may be used for providing such an indication, however also further hardware elements external from the fingerprint sensor 102 may be used for making such a determination. In any case, there is a desire to receive the indication of contact at an early stage of contact between the finger and the fingerprint sensor 102.

The fingerprint sensor 102 is further arranged to apply, S2, a first fingerprint image acquisition setting. The first fingerprint image acquisition setting must however not explicitly be applied subsequent to the indication of contact between the finger and the fingerprint sensor 102 is received. Rather, the first fingerprint image acquisition setting may be applied to the fingerprint sensor 102 beforehand, at an earlier stage. Any order is possible and within the scope of the invention.

In any case, once the fingerprint sensor 102 has applied the first fingerprint image acquisition setting and the contact is determined between the finger and the fingerprint sensor 102, a first fingerprint image is acquired using the first fingerprint image acquisition setting, S3. As mentioned above, the first fingerprint image acquisition setting is typically set to apply an at least slightly lower sensitivity level, typically targeting a sweaty finger (somewhat more humid as compared to a normal humidity level of a finger). In some embodiments of the invention, the sensitivity level is at least 15%, preferably 25%, lower as compared to the sensitivity level used for a "normal" finger.

Once the first fingerprint image is acquired using the first fingerprint image acquisition setting, a second fingerprint image acquisition setting is applied, S4, to the fingerprint sensor 102. The second fingerprint image acquisition setting is arranged to target a normal finger, i.e. the sensitivity level is higher as compared to the first fingerprint image acquisition setting, and when the fingerprint sensor 102 is adapted to the second fingerprint image acquisition setting, a first fingerprint image is acquired, S5, using the second fingerprint image acquisition setting.

Accordingly, two images have been acquired using two different settings for the fingerprint sensor 102, where the first out of the two images is acquired with a slightly lower sensitivity level for the fingerprint sensor 102 as compared to the second out of the two images. Following the acquisition of the two images, the images are evaluated, S6, based on a quality metric. Evaluation in relation to the quality metric may for example include examining a spatial intensity variation in the acquired fingerprint images, and/or examining at least one of an image saturation and a histogram width in the acquired fingerprint images. Depending on the outcome of the evaluation, at least one of the acquired fingerprint images is selected, S7. The selected fingerprint image may then be used by e.g. the electronic device/mobile phone 100, in a process for authenticating/verifying a user, e.g. in the process of unlocking the mobile phone 100. The time period between acquiring the two fingerprint images is preferably less than 60 ms, in some instances as low as 10 ms (or even lower). The actual time selected between acquiring the fingerprint images may be allowed to depend on the physical constrains placed on the fingerprint sensor system 400.

In some embodiments, and taking into account the fingerprint images shown in FIGS. 3a to 3d, it may be of interest to acquire a second fingerprint image using the fingerprint image acquisition setting, acquired prior to applying the second fingerprint image acquisition setting. Accordingly, a first and a second image will be acquired using the "sweaty finger setting". Thus, depending on e.g. speed of approach of the finger and/or the actual level of humidity of the finger, the contact between the fingerprint sensor 102 and the finger may be better optimized for the first fingerprint image acquisition setting. The evaluation step will thus also take into account the second fingerprint image acquired using the first fingerprint image acquisition setting.

As defined by the invention, the sensitivity level for the first fingerprint image acquisition setting is lower as compared to the second fingerprint image acquisition setting. However, the actual sensitivity level for the second fingerprint image acquisition setting may be set dynamically and may be allowed to depend on an analysis of the first and/or second fingerprint image acquired using the first fingerprint image acquisition setting. Accordingly, an automatic gain control may be applied for determining the sensitivity level for the second fingerprint image acquisition setting, i.e. the second fingerprint image acquisition setting must not be fixed.

Also the first fingerprint image acquisition setting may be set dynamically and may be allowed to depend on previously acquired fingerprint images, typically taken at an earlier time of using the fingerprint sensor system 400. As an alternative, or also, the first fingerprint image acquisition setting may be set depending on a current environmental condition, relating to the fingerprint sensor system 400 and or relating to the user. As an example, in case the fingerprint sensor system 400 is comprised with the mobile phone 100 and the mobile phone 100 is executing a "training" application (running, biking, etc.), this may be used as an indication of that the user will have a slightly more humid finger as compared to a normal situation. An estimated activity level for the user may thus be used as an input when selecting the first sensitivity level for the first fingerprint image acquisition setting.

According to the invention and as understood form the above, it is assumed that the finger contacting the fingerprint sensor 102 will be sweaty. When acquiring the initial (e.g. one or two) fingerprint image(s) this will be taken into account by using a slightly lower sensitivity setting for the fingerprint sensor 102 than what would be used in acquiring a finger having a normal humidity level (or a dry finger). A sweaty finger will, over time, make "to good contact" with the fingerprint sensor 102 and thus result in a saturated fingerprint image.

As a comparison and as shown in FIGS. 6a to 6d, this is not the case when handling a finger having a normal humidity level, or being a dry finger. In a similar manner as shown in FIGS. 3a to 3d, four images have been acquired with about 10 ms apart. As can be seen, the conductivity of the finger is not increasing over time, rather the quality of the acquired fingerprint images will depend on well the finger is positioned in relation to the fingerprint sensor 102. For example, in case the first fingerprint image is acquired "too early", i.e. before the finger is properly placed at the fingerprint sensor 102 the area of the finger captured by the fingerprint sensor 102 may be less than required to qualify as a "good" fingerprint image.

The invention takes also the above into account. That is, in using the approached proposed in accordance to the invention, at least the first fingerprint image is acquired using a sensor setting adapted for a "sweaty" finger. Further fingerprint images may then be acquired by dynamically changing the sensor setting based on previously acquired fingerprint images, or by using a less dynamical approach where the sensor setting is changed to a setting adapted for a finger having a normal humidity level. Thus, the understanding is that in case the finger is sweaty when contacting the fingerprint sensor 102, the quality of an acquired fingerprint image will not likely improve over time as humidity at the finger over time gradually will obscure the valleys between the friction ridges. Therefore, it is desirable to act as soon as the finger has made contact with the fingerprint sensor 102 and applying a sensor setting having this in mind.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:
1. A method of acquiring a fingerprint image of a finger by means of a fingerprint sensing system comprising a fingerprint sensor and processing circuitry connected to the fingerprint sensor, wherein the method comprises:
receiving an indication of the finger contacting the fingerprint sensor;
applying a first fingerprint image acquisition setting for the fingerprint sensor, the first fingerprint image acquisition setting including a first sensitivity level for the fingerprint sensor;
acquiring, subsequent to receiving the indication of the finger contacting the fingerprint sensor, a first fingerprint image using the first fingerprint image acquisition setting;
applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level;
acquiring, subsequent to applying the second fingerprint image acquisition setting, a first fingerprint image using the second fingerprint image acquisition setting;
evaluating the acquired fingerprint images based on a quality metric, and
selecting at least one of the acquired fingerprint images satisfying the quality metric,
wherein the second fingerprint image acquisition setting is adapted for acquiring a finger with low or normal level of humidity, and the first fingerprint image acquisition setting is adapted for acquiring a finger with an in comparison higher level of humidity.
2. The method according to claim 1, further comprising:
acquiring, subsequent to acquiring the first fingerprint image using the first fingerprint image acquisition setting, a second fingerprint image using the first fingerprint image acquisition setting.
3. The method according to claim 1, wherein evaluating comprises examining a spatial intensity variation in the fingerprint images.
4. The method according to claim 1, wherein evaluating comprises examining at least one of an image saturation and a histogram width in the fingerprint images.
5. The method according to claim 1, further comprising:
applying, subsequent to acquiring the first fingerprint image using the second fingerprint image acquisition setting, a third fingerprint image acquisition setting for the fingerprint sensor, the third fingerprint image acquisition setting being based on the evaluation of the first fingerprint image acquired using the second fingerprint image acquisition setting; and
acquiring a first fingerprint image using the third fingerprint image acquisition setting.
6. The method according to claim 2, wherein the second fingerprint image acquired using the first fingerprint image acquisition setting is acquired a predetermined time subsequent to acquiring the first fingerprint image acquired using the first fingerprint image acquisition setting, the predetermined time being between about 5-60 ms, preferably between 15-60 ms.

7. The method according to claim 1, further comprising:
post-processing the at least one fingerprint image satisfying the predetermined quality metric.
8. The method according to claim 1, further comprising:
combining at least two of the acquired fingerprint images.
9. The method according to claim 1, further comprising:
retrieving a signal indicative of an environmental condition that may affect a property of the finger; and
selecting the first fingerprint image acquisition setting based on the environmental condition.
10. A fingerprint sensing system, comprising:
a fingerprint sensor;
a memory; and
processing circuitry connected to the fingerprint sensor for:
receiving an indication of the finger contacting the fingerprint sensor;
applying a first fingerprint image acquisition setting for the fingerprint sensor, the first fingerprint image acquisition setting including a first sensitivity level for the fingerprint sensor;
acquiring, subsequent to receiving the indication of the finger contacting the fingerprint sensor, a first fingerprint image using the first fingerprint image acquisition setting;
applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level;
acquiring, subsequent to applying the second fingerprint image acquisition setting, a first fingerprint image using the second fingerprint image acquisition setting;
evaluating the acquired fingerprint images based on a quality metric, and
selecting at least one of the acquired fingerprint images satisfying the quality metric,
wherein the second fingerprint image acquisition setting is adapted for acquiring a finger with low or normal level of humidity, and the first fingerprint image acquisition setting is adapted for acquiring a finger with an in comparison higher level of humidity.
11. The fingerprint sensing system according to claim 10, wherein the fingerprint sensor is a capacitive fingerprint sensor.
12. An electronic device comprising:
the fingerprint sensing system according to claim 10; and
a device controller for:
performing an authentication of the finger based on the at least one selected fingerprint image, and
performing at least one action only if the authentication indicates an authentication success.
13. The electronic device according to claim 12, further comprising at least one sensor for sensing a local environment of the electronic device, the controller being configured to provide a signal indicative of an environmental condition that may affect a property of the finger to the fingerprint sensing system.
14. The electronic device according to claim 13, wherein the at least one sensor includes at least one sensor selected from a group comprising a temperature sensor and a humidity sensor.
15. The portable electronic device according to claim 12, wherein the portable electronic device is a mobile phone.

16. A computer program product comprising a non-transitory computer readable medium having stored thereon computer program means for controlling a portable electronic device, the portable electronic device comprising a fingerprint sensing system including a fingerprint sensor and processing circuitry, the fingerprint sensing system adapted for acquiring a fingerprint image of a finger, wherein the computer program product comprises:
  code for receiving an indication of the finger contacting the fingerprint sensor;
  code for applying a first fingerprint image acquisition setting for the fingerprint sensor, the first fingerprint image acquisition setting including a first sensitivity level for the fingerprint sensor;
  code for acquiring, subsequent to receiving the indication of the finger contacting the fingerprint sensor, a first fingerprint image using the first fingerprint image acquisition setting;
  code for applying, subsequent to acquiring the first fingerprint image, a second fingerprint image acquisition setting for the fingerprint sensor, the second fingerprint image acquisition setting including a second sensitivity level for the fingerprint sensor, the second sensitivity level being in comparison higher than the first sensitivity level;
  code for acquiring, subsequent to applying the second fingerprint image acquisition setting, a first fingerprint image using the second fingerprint image acquisition setting;
  code for evaluating the acquired fingerprint images based on a quality metric, and
  code for selecting at least one of the acquired fingerprint images satisfying the quality metric, wherein the second fingerprint image acquisition setting is adapted for acquiring a finger with low or normal level of humidity, and the first fingerprint image acquisition setting is adapted for acquiring a finger with an in comparison higher level of humidity.

* * * * *